Feb. 7, 1939.  J. D. HUFFMAN ET AL  2,146,145
TRACTOR-TRAILER COMBINATION
Filed Oct. 29, 1936
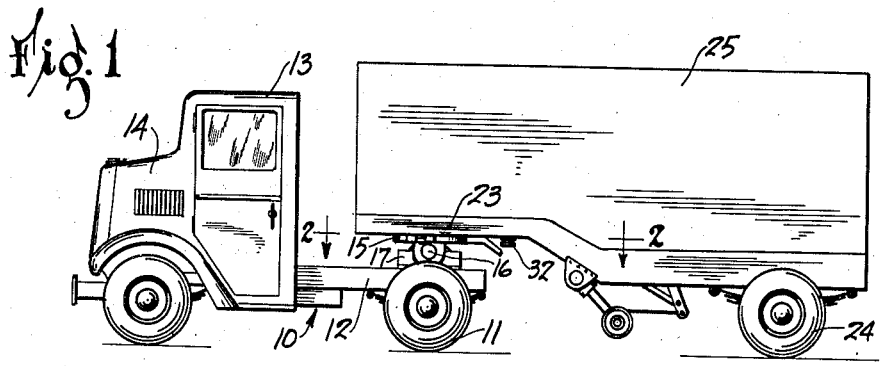
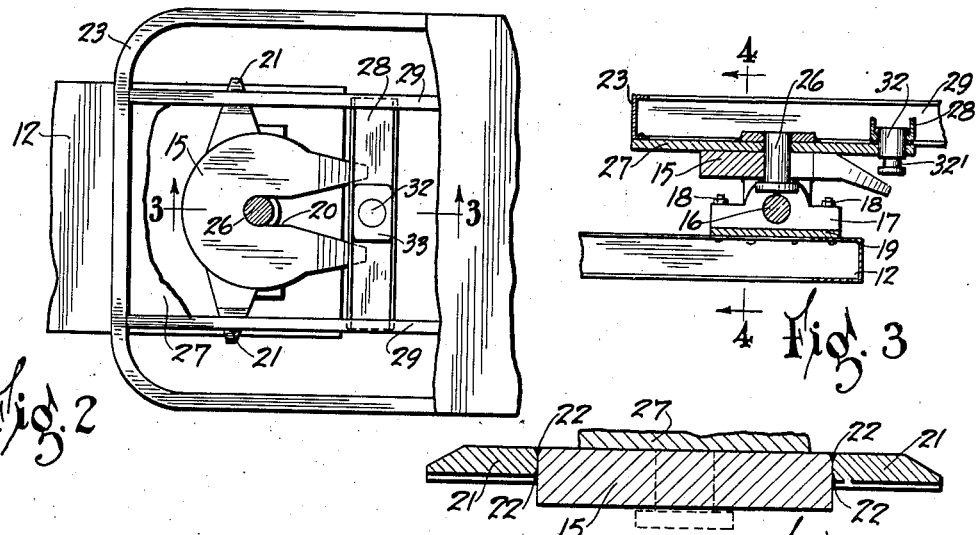
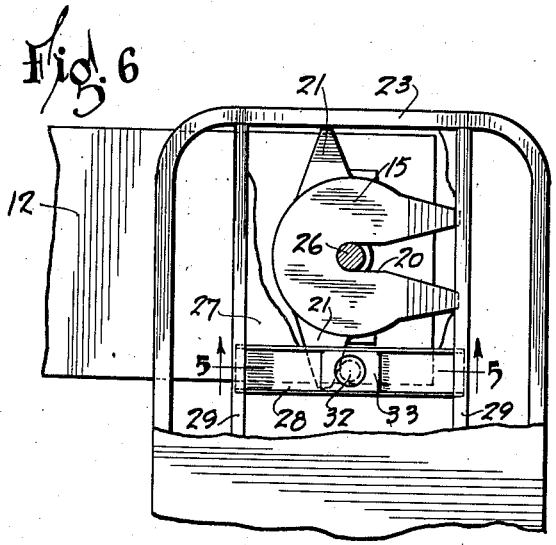
INVENTORS.
NORWOOD H. WILKINSON
JAY D. HUFFMAN
BY
ATTORNEY Patented Feb. 7, 1939

2,146,145

UNITED STATES PATENT OFFICE 2,146,145

TRACTOR-TRAILER COMBINATION

Jay D. Huffman, South Bend, Ind., and Norwood H. Wilkinson, Niles Township, Berrien County, Mich., assignors of one-third to Hugh Suddarth, Roseland, South Bend, Ind.

Application October 29, 1936, Serial No. 108,124

1 Claim. (Cl. 280—33.1)

This invention relates to a tractor and semi-trailer combination and particularly to the coupling means therefor which has means cooperative with one of the coupling members to prevent the tractor from turning beyond a predetermined angle relative to the trailer.

One of the primary objects of our invention is to provide means on the fifth wheel member carried by the tractor against which means on the trailer may abut to prevent turning of the tractor relative to the trailer beyond a predetermined angle.

A further object is to provide a fifth wheel member having oppositely extending projections thereon carried by the tractor and a pin carried by the trailer adapted to engage one of the projections upon turning of the tractor relative to the trailer a predetermined amount to prevent further turning of the tractor relative to the trailer.

Another object is to provide a fifth wheel member carried by the tractor which has outwardly extending lugs or stops on opposite sides thereof and a pin supported by the trailer in spaced relation to the king-pin also supported by the trailer adapted to move into engagement with one of the lugs or stops upon turning of the tractor relative to the trailer a predetermined amount in either direction to prevent "jackknifing" of the tractor and trailer.

Other objects, and features relating to details of construction, methods of manufacture and details of assembly will be apparent from the drawing and the detailed description to follow.

In the drawing in which like reference numerals refer to like parts throughout the several views and in which the sections are taken looking in the direction of the arrows at the ends of the section lines:

Fig. 1 is a side elevational view of a tractor and semi-trailer combination showing our invention incorporated therewith;

Fig. 2 is a plan view of the forward portion of the trailer frame, the rear portion of the tractor having the lower fifth wheel member mounted thereon, and the means for preventing the turning of the tractor relative to the trailer beyond a predetermined limit;

Fig. 3 is a vertical sectional view taken on the line 3—3 of Fig. 2;

Fig. 4 is a detailed sectional view taken on the line 4—4 of Fig. 3 showing the pin and support therefor, the pin being in engagement with one of the stops on the lower fifth wheel member;

Fig. 6 is a view similar to Fig. 2 but with the tractor turned substantially 90° relative to the trailer.

Heretofore it has been the common practice to provide a fifth wheel for coupling a tractor to a semi-trailer together which would permit the turning of the tractor relative to the semi-trailer to enable the operator to "spot" the semi-trailer in a desired position and also to permit the usual turning movement by the tractor and semi-trailer when traveling on the road. Such constructions have, however, provided no means which would prevent the tractor and trailer from "jackknifing": that is, the tractor turning at too great an angle relative to the trailer. In many cases if the tractor is turned at too great an angle relative to the trailer, the cab on the tractor will hit against the trailer body thus causing damage to either or both the cab and body.

Our invention contemplates means which will prevent the turning of the tractor beyond a predetermined limit relative to the trailer so that under no conditions will the cab hit against the trailer body to damage either or both of the same. Such accidents as heretofore described have often happened when the operator was attempting to place the semi-trailer in position at a loading dock or when traveling on icy roads the semi-trailer would skid, throwing the body thereon into violent contact with the cab which in either case would result in injury to either or both the body and cab.

In order that others may better understand the advantages and construction of our invention reference will be had to the accompanying drawing which is to be taken as illustrative only and not as limiting the scope of our invention. We have shown a tractor 10 having driving wheels 11, a frame 12, a cab 13 and an engine (not shown) mounted within the hood 14. The truck or tractor may be of any approved design and does not require any additional or different parts from tractors now on the market to incorporate our invention therein so that a further description of the same is not thought necessary.

A lower fifth wheel member 15 is pivotally supported at 16 in a block 17 secured by bolts 18 or other suitable fastening means onto a plate 19 supported by the tractor frame members 12. The lower fifth wheel member 15 is provided with the usual king-pin receiving slot 20 and has a pair of oppositely extending stops or lugs 21 secured thereto, as illustrated in Fig. 4, by welding or other suitable means 22, or they may be formed as a part of the plate portion thereof whereby the lugs or stops 21 are substantially secured to the fifth wheel member 15.

The semi-trailer comprises a frame 23 supported at its rear end by wheels 24 and having a body 25 mounted thereon all of which may be of standard construction as is now used in several makes of semi-trailers now on the market. The king-pin 26 carried in an upper fifth wheel member 27 may be secured in any suitable manner to the frame 23 of the semi-trailer as is the present practice. When the tractor 10 is backed under the semi-trailer the king-pin 26 will enter the slot 20 in the lower fifth wheel member 15 and is adapted to be locked therein for coupling the tractor and semi-trailer together. We have not illustrated the locking means associated with the lower fifth wheel member for locking the kingpin 26 therein as any of the lower fifth wheel members now in commercial production may be used, including the locking means therefor, and as the same forms no part of our invention an illustration or description of the same is not thought necessary.

We preferably provide a channel member 28 which extends transversely of the semi-trailer, the same seating on the lower flanges of the trailer frame members 29, the ends thereof being secured to the frame members 29 by rivets or other suitable securing means 30, also the ends of the channel member 28 preferably are welded to the frame members 29 so that the same forms an integral part of the trailer frame structure. Intermediate the ends of the channel frame member 28 we provide an opening 31 therethrough in which is inserted a pin 32. Reinforcing plates 33 and 34 also having openings therethrough for receiving the pin 32 are positioned on the top and bottom of the web of the channel member 28 and are preferably welded or otherwise rigidly secured thereto. The pin 32 is welded or by other suitable means is securely fastened in the mating openings extending through the web of the channel member 38 and the plates 33 and 34 so that the same cannot be knocked loose or bent in its supporting means.

The pin 32 is mounted in a predetermined spaced relationship to the king-pin 26 so that upon turning of the tractor 10 a predetermined limit, which as illustrated is substantially 90° relative to the trailer, the pin 32 will abut against one or the other of the stops or lugs 21 on the lower fifth wheel member 15, depending upon which direction the tractor is turned relative to the trailer to prevent turning of the tractor relative to the trailer beyond the predetermined limit. In practice, it has been found that it is not necessary or desirable to turn the tractor more than approximately 90° relative to the trailer so we have illustrated our invention as having the lugs positioned on the lower fifth wheel member 15 to permit that amount of turning of the tractor relative to the trailer.

The pin 32 is preferably recessed at 32' so that the stop 21 will seat in the recess when the pin 32 is in engagement therewith. As the stop 21 seats in the recess the flanges thereof will prevent relative vertical movement between the stop and the pin, thus preventing any possibility of the pin coming out of engagement with the stop to permit further turning of the tractor relative to the semi-trailer.

In the drawing and throughout the specification, we have described the fifth wheel member as being carried by the tractor, and the king-pin 26 and the pin 32, as being supported by the semi-trailer because the fifth wheel member are usually mounted in that manner. It is to be understood, however, that the fifth wheel member and the pin 32 can be mounted in reverse position; that is, the fifth wheel member can be mounted on the semi-trailer and the kingpin 26 and the pin 32 can be carried by the tractor so that our invention will be equally as effective by the reversal of these parts:

While we have shown and described a preferred embodiment of our invention, it is to be understood that formal changes, and changes in design and construction, can be resorted to which will be apparent to those skilled in the art without departing from the spirit and substance of our invention, the scope of which is to be measured only by the scope of the subjoined claim.

What we claim is:

In a tractor-trailer combination, a tractor having a fifth wheel member including a planar body portion having diverging downwardly angled wings defining a guide slot for a kingpin, a pair of oppositely extending lateral extensions on said body portion below the upper surface thereof, a trailer having an under frame provided with a flat plate portion adapted to ride up said wings and rest on said fifth wheel member body portion when said tractor and trailer are in coupled position, a depending kingpin carried in said plate portion and adapted to be moved through said slot into coupled position when said plate portion rests on said body portion, a second pin depending from said trailer frame in longitudinal alinement with said kingpin and spaced rearwardly therefrom a distance such that it clears said body portion upon relative rotation of said tractor and said trailer but has abutting engagement with the rear vertical faces of said extensions to limit said relative rotation, said second depending pin being of an axial length such that it may ride over said downwardly angled wings without engaging the same, but is capable of entering said slot when said tractor and trailer are in longitudinal alinement upon shearing of said kingpin.

JAY D. HUFFMAN.
NORWOOD H. WILKINSON.